Oct. 20, 1959   O. M. LILEY   2,909,197
DEVICE FOR METERING AND EXPANDING ANHYDROUS AMMONIA GAS
Filed Nov. 26, 1956
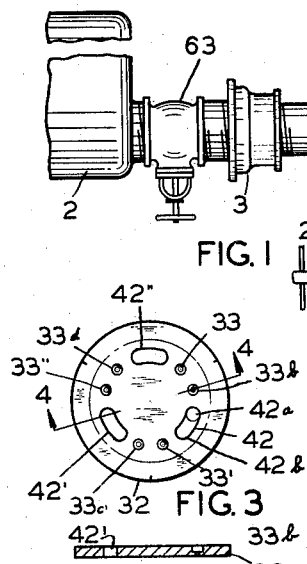
FIG. 1
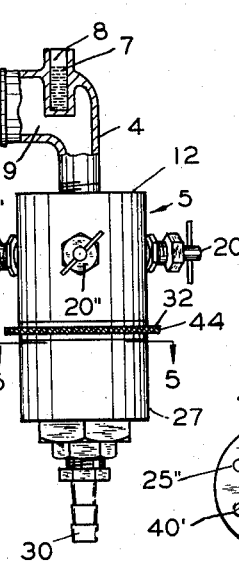
FIG. 3
FIG. 4
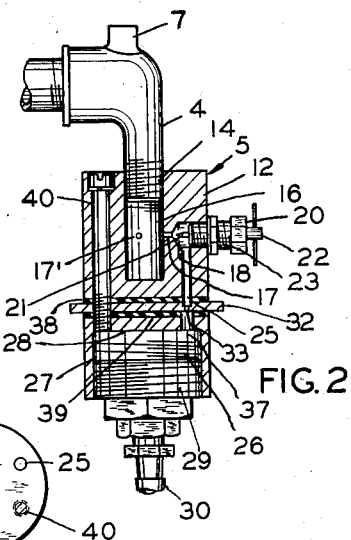
FIG. 2
FIG. 5
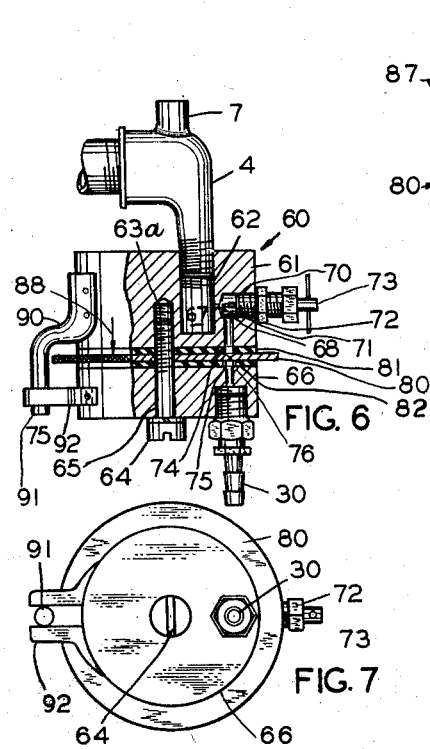
FIG. 6
FIG. 7
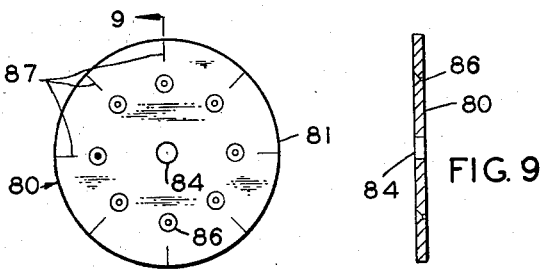
FIG. 8
FIG. 9
INVENTOR.
Otis M. Liley
BY Scott L. Norvie
atty United States Patent Office 2,909,197
Patented Oct. 20, 1959

2,909,197

DEVICE FOR METERING AND EXPANDING ANHYDROUS AMMONIA GAS

Otis M. Liley, Phoenix, Ariz.

Application November 26, 1956, Serial No. 624,349

2 Claims. (Cl. 138—45)

This invention pertains to metering devices for anhydrous ammonia gas.

It is well known that anhydrous ammonia gas is compressed into cylinders and these cylinders are transported to the place of use and the gas allowed to escape through metering devices at a uniform desired rate. One of the common uses for this gas is for fertilizing soil and water used to irrigate the soil. The gas must be distributed at a pre-determined rate according to the demand and this rate must be calculated in view of the temperature of the gas in the storage tank, the pressure of the gas in the storage tank, and the conditions of applications including the atmospheric temperature and pressure and the rate of demand which, in turn, depends upon the rate at which the gas is to be applied to irrigation water or to the soil, as the case may be.

Heretofore, gas has been metered through orifices in specially constructed orifice plates made for the purpose. These plates had only one orifice hole and this was accurately sized in order to permit the escape of a definite amount of gas. Where the gas containing cylinder was transported to lands where it was to be applied the properly sized orifice was placed in a container in the pipe leading from the cylinder and the control valve on the cylinder opened. This permitted the gas to escape at a uniform rate so long as the temperature did not vary excessively and this operation was successful if the demand did not vary. However, if the demand for the gas varied due to the fluctuating flow of the irrigation water it was necessary to change the orifice plate. Such an operation, involving high pressure gas, cannot, as a rule, be entrusted to a farm operator or his help, therefore, it has been found necessay to call the gas service operator and have him come to the farm location and change the orifice plate. This awkward situation requires time and unnecessary expense. Heretofore there has been some effort made to provide apparatus, including multiple fittings and multiple orifices with control valves for each orifice plate so that the farmer could open or close control valves without having to change the orifice plates. Such an operation has proved successful and is now in limited use. One example of such apparatus is shown in my application for patent, Serial No. 528,412 filed August 15, 1955 in the United States Patent Office, and described as Multiple Orifice Metering Mechanism for Anhydrous Ammonia now Patent No. 2,821,210.

The present device is an improvement on the apparatus shown in the above described application and, is therefore to be considered a continuation in part of said application.

It has been found that to be successful and practical the metering device must include a fixed orifice. The channels or passageway on each side of the orifice must be ample and adequate and free from curves, corners or channels. Any such curved passageways or obstructions will cause the expanding gas to freeze up and close or partially close the passageway and therefore vary the amount of gas allowed to escape.

This will defeat the basic purpose of the metering device. It is also well known that metering devices which depend upon needle valves, whether the valve is controlled by spring pressure or otherwise, are not suitable for metering anhydrous ammonia. The large amount of refrigeration produced by the expanding gas, as it courses through the valve passageway, causes the needle and valve seat to vary both as to dimensions and as to setting so that the device cannot be depended upon to meter a desired amount of gas. Further, the refrigeration produced causes some of the gas to solidify; further it causes impurities in the gas to solidify, and the passageways in metering devices become partially or wholly obstructed and the flow of gas varied in an undesired manner.

In view of the foregoing one of the objects of my invention is to provide a metering device for anhydrous ammonia gas which has a multiple orifice plate which may be adjusted as desired to move orifices of various sizes into the flow channel or channels which lead from the storage tank to the delivery pipe.

Another object of the invention is to provide a gas metering device which has a plurality of channels connected to the inlet end of the device, with a valve controlling the flow of gas through each of the channels, and an orifice plate interposed in the channels, downstream of the several control valves, which has a means for moving a plurality of orifices into any one or all of the channels controlled by said valves.

Still another object is to provide a metering device having a body with a chamber at its inlet end communicating with several channels, each having a control valve and connecting with a chamber at the outlet end of the device, combined with an orifice plate containing a plurality of orifices for regulating the expansion of anhydrous ammonia gas, interposed between the inlet end portion of said body and the outlet end portion; said plate being rotatively movable so that orifices of pre-determined size may be interposed between the inlet end and the outlet end of any one of the several channels.

Other objects will appear hereinafter.

I attain the foregoing objects by means of the devices, parts and combinations of parts shown in the accompanying drawings, in which—

Figure 1 is a side elevation of a device incorporating my improvements;

Figure 2 is a mid sectional elevation thereof;

Figure 3 is a plan view of an orifice plate interposed between the inlet end and the outlet end portion of said metering device;

Figure 4 is a section of said orifice plate taken substantially on line 4—4 of Figure 3;

Figure 5 is a plan view of the top of the outlet portion of said device.

Figure 6 is a side elevational view of a modified form of my device with a portion thereof broken away to show interior construction;

Figure 7 is a bottom view thereof;

Figure 8 is a plan view of a multiple orifice plate used with said modified form; and Figure 9 is a section of said orifice plate taken substantially on line 9—9 of Figure 8.

Similar numerals refer to similar parts in the several views.

Referring to Figures 1 through 5 of the drawings, numeral 2 indicates a portion of the ammonia storage tank, 3 connections between the tank and the metering device here shown and 4 the fitting which connects the parts marked 3 with the body of the metering device 5.

The fitting 4 is substantially a street L which has been provided with a thermo-well 7 which is set into the top portion of the body of the L and is adapted to contain oil 8 so that a thermometer placed in the well is in thermal contact with the gas within the body of the L in the space indicated generally by numeral 9.

The upper part of the body 5 of the metering device is made from a solid block of metal, marked 12. This has a central bore 14 which is threaded to receive the downward trending portion of the L 4. This bore opens into a chamber 16 from which three radial holes such as, for example, 17, are drilled. Each hole opens into a valve chamber such as 18 into which a valve body 20 is screwed.

Each valve body is made with a pointed valve plug 21 at the inner end of a valve stem 22. This stem threads in and out of the valve body 20 and is provided with a gas proof gland structure 23.

As shown, there are three radial openings such as 17. The opening to the left of the opening marked 17 in Figure 2 is indicated by 17' and is closed by valve 20', and the opening that would be in the cut off portion of the body is closed by a valve marked 20" in Figure 1.

Each of the valve chambers 18, 18' and 18" opens into a delivery passageway, such as 25 (see Figure 2). This passageway is radially positioned relative to the axis of the body 12 and each passageway is equally spaced from the others and all are the same distance from the center of the body (see Figure 5). The passageways other than 25 are indicated by 25' and 25".

Each of the passageways 25, 25' and 25" open into a receiving chamber 26 in the lower portion 27 of the body 5. This chamber 26 is located in a central bore of the part 27 and is closed at the top by a flat portion 28 and by a plug 29 at the bottom of the chamber which is threaded into the body portion 27. The plug is provided with fittings 30 to enable the outlet to be attached to a flexible delivery hose.

Between the two body parts 12 and 27 there is an orifice plate 32. This plate is shown more particularly in Figures 3 and 4, and includes six orifices 33, 33', 33", 33b, 33c, and 33d, all radially spaced so as to register with the passageways 25, 25', and 25" in the upper body part 12 and 37 in the lower body part 27. Thus when valve 20 is open gas flows through the radial hole 17 into chamber 18 and thence downward through the passageway 25 and orifice hole 33, thence through passageway 37 into the chamber 26 from which it flows outward through the fitting 30.

The adjacent faces of body parts 12 and 27 are flat and gaskets 38 and 39 are positioned on these adjacent faces and between the upper and lower faces, respectively, of the orifice plate 32.

Machine bolts 40, 40', and 40" arranged at three equally spaced positions around the outer portion of the body parts 12 and 27 hold these parts together. The heads of these bolts engage the upper body part 12 while their threaded lower ends are screwed into the lower body part 27. These bolts extend through the gaskets 38 and 39 and through arcuate slots 42, 42' and 42" in the orifice plate 32. Thus when the screws are not drawn tight the orifice plate may be grasped by the knurling 44 on its edge and rotated within the limits of the slots 42, etc. The openings of the passageways 25, 25' and 25", extending through both body parts, as well as the respective orifice openings 33, 33' and 33", in the interposed plate 32, are located so that when the bolts 40, 40' and 40" occupy a position at one end of the slots 42, 42' and 42" the orifices marked 33, 33' and 33" are in register with the openings to the passageways marked with the corresponding prime numbers, at all three positions. Thus any one of the three valves 20, 20' and 20", when opened with plate 32 positioned with bolt 40 at the end of slot 42, marked 42a, and with the other two bolts in similar positions in the other two slots, gas will flow from chamber 16 to chamber 26 through the orifice openings marked 33, 33' and 33" according to the opening of the several valves.

By loosening bolts 40, 40' and 40" and shifting the orifice plate to the other extremity of its travel, in slots 42, 42' and 42", marked 42b, the passageways 25, 25' and 25" will be in register with orifice openings marked 33b, 33c and 33d.

From the foregoing it will be seen that there are three valve controlled outlets from chamber 16, each of which may be opened to three orifices in plate 32, marked 33, 33' and 33". These orifices may be of definite sizes so that a pre-determined amount of gas will expand through each. These orifices may be graded so that 33 is the smallest and 33" the largest. With the orifice plate in the first position mentioned where it is limited in its rotary motion by bolts 40, etc. at the position 42a the user of the device has three orifices available for expanding gas from the cylinder 2 into fitting 30. By opening more than one valve at one time a combination using any two or all three of the valves 20, is also possible. By rotatively shifting valve plate 32 the user of the device has three different orifices available for the passageways of the valves 20, 20', and 20". The orifices marked 33b, 33c and 33d may be of graduated sizes so that a volume of gas may be delivered through them or their various combinations, as above suggested, so that there will be a graded series of orifice openings following those available by the use of the orifice first mentioned.

It will be readily understood that by making the plate 32 larger so that the spaces between the orifices 33 and 33b, for example, are greater, other orifices may be added, thus making even a greater combination of orifices available. It is also possible to use more than three valves, such as 20, with corresponding passageways.

In use it is to be understood that when plate 32 is shifted the pressure of the gas in the tank is shut off by means of a main valve 63 which is between the tank and the L fitting 4. When the pressure is released on plate 32 it may be shifted easily. Only the plate rotates when it is shifted because the gaskets are perforated the same as the top 28 of body portion 27, and the bottom face of body portion 12. The bolts 40, 40', and 40" hold the gaskets against rotation.

In the modified form of the invention, shown in Figures 6, 7, 8 and 9, the body of the device indicated by numeral 60 is composed of two parts. The upper part 61 is provided with an eccentrically positioned bore 62 to receive the L fitting 4 which also contains the thermowell 7. A centrally located bore 63a is threaded to receive a machine bolt 64 which extends upward through a central bore 65 in the lower part 66 of the body 60. The chamber 67 formed by the lower part of bore 62 communicates through an opening 68 to a valve chamber 70. This valve chamber is formed by a radial hole 71 which is threaded to receive the valve body 72. The valve stem 73 is tapered at its inner end and seats on the opening 68. The valve chamber 70 opens into a passageway 74 which extends downward to the lower face 75 of the body part 61. An opening 76 in lower body part 66 is in mating relation with opening 74 and extends downward through the body part to the fitting 30. A metering plate 80 is positioned between gaskets 81 and 82. This metering plate has a larger diameter than that of either body part and its peripheral rim is knurled so that it may be easily turned. The gaskets 81 and 82 are perforated in registering positions with openings 74 and 76, respectively. The gaskets are also centrally perforated to allow the insertion of the bolt 64.

The metering plate 80 is perforated centrally at 84 to receive bolt 64 and is perforated by a plurality of orifice openings 86 which are annularly arranged at spaced positions. On the rim portion of the plate which extends beyond the sides of the body parts 61 and 66 there are indicia 87 which indicate the radial position of the several orifices. These indicia may be read and alined with indicia marked 88 on the outer surface of upper body part 61.

In order to keep the body parts 61 and 66 in proper rotative position so that the passageways 74 and 76 may be maintained in register, I provide a bracket 90 on body part 61 which has a downwardly extending finger 91. This finger engages a fork piece 92 which is attached to lower body part 66.

In use the L fitting is attached to the pipe leading from tank 2, as above explained, with reference to the first form shown. Any convenient hose or distribution tube is attached to the fitting 30 in a manner similar to that intended for fitting 30 in the form first shown.

The bolt 64 is then loosened and orifice plate 80 turned until an orifice opening 86 of the size desired is in register with the openings 74 and 76. The bolt 64 is then tightened so that the adjacent faces of the body parts 61 and 66 clamp gas tight on the gaskets 81 and 82, and the gaskets in turn are held gas tight on the orifice plate 80. Valve 72 is then opened to allow gas to expand from chamber 67 into the fitting 30. Should it become necessary to vary the flow of anhydrous ammonia, during an irrigation run, or otherwise during use, the valve 63 in the pipe leading from tank 2 is shut off and the bolt 64 loosened and the orifice plate rotated by grasping its edges until a different desired orifice is alined with the passageways 74 and 76. Thereafter the bolt 64 is again tightened and the operation resumed. The use of the thermo-well 7 is well known to those familiar with the art. However, so far as its operation is concerned with the present apparatus, it is sufficient to say that when the tank 2 is first installed at a location where gas is to be distributed, gas is first let into the L fitting 4 with all orifice controlling valves closed. Main valve 63, when opened, lets gas into the interior 9 of the fitting 4. Its temperature is then read. The orifice opening or openings necessary to meter a desired amount of gas are then selected, taking into consideration the temperature of the gas in the thermo-well. The amount of gas that will escape and expand through an orifice of a given size at a determined temperature is well known. The user of the device sets the orifice plate of either form of the device in a position so that the orifice or the orifices adapted to deliver the required amount of gas will be aligned with the control valves, as above described. With the orifice plate in proper position the valves are then opened and the desired amount of gas will be metered through the orifices thus selected.

Should the irrigator or farmer desire a change in the rate of flow during any one run of gas from cylinder 2 he can make the adjustment by opening or closing the several valves shown in the preferred form of the device above described. In the case of the modified form it is necessary for him to shut the main valve 63 on the tank and change the position of plate 80, as previously explained and then reopen valve 63. While the modified form of the device is shown with only one valve it is to be understood that, if desired, several valves such as 72 may be installed at desired positions around the perimeter of the body 60. It is to be observed that the difference in structure between the first form shown and the second lies mainly in the fact that movement of the orifice plate in the first form described is limited by the arcuate slots 42 in the plate. In the second form shown the plate is free to rotate, however, the various positions of the orifice must be noted by the means of the indicia marked on the rim portion of the plate and the outer surface of the body.

I claim:

1. A selectable orifice control device comprising, an upper body portion, a lower body portion movable relative to said upper body portion, a centrally positioned releasable bolt interconnected between both of said body portions for clamping the same together, a device connected between said body portions to prevent relative rotation of said body portions about the axis of said centrally positioned bolt, a metering plate having a series of circumferentially spaced differently sized orifices extending axially therethrough located between said upper and lower body portions for rotation in a circle having its center coinciding with the axis of said centrally positioned bolt when released, a passageway in said upper body portion having an opening in alignment with said circle of said orifices in said metering plate, a source of fluid pressure supply connected to said passageway, a passageway in said lower body portion having an opening in alignment with said circle of said orifices in said metering plate on the other side of said orifices from said first mentioned passageway opening, and means for connecting discharge from said second mentioned passageway to a distributor means for said orifice controlled fluid pressure, said bolt serving when tightened to clamp said metering plate axially between said upper and lower body portions in fluid tight relationship.

2. A selectable orifice control device comprising an upper body portion having a radially disposed abutment surface, a lower body portion having a radially disposed abutment surface facing and movable axially relative to said abutment surface on said upper body portion, a centrally positioned releasable bolt in said body portions adapted to be operated to move said abutment surfaces toward each other, a positioning device interconnected between said upper and lower body portions adapted to prevent relative rotation of said body portions about the axis of said bolt while allowing relative axial movement between said body portions, a fluid pressure supply passageway in said upper body portion having an opening in said radially disposed abutment surface of said upper body portion, a fluid pressure discharge passageway in said lower body portion having an opening in said radially disposed abutment surface of said lower body portion and aligned with said opening in said radially disposed surface in said upper body portion, a rotatable metering plate located between radially disposed abutment surfaces and journaled to rotate about the axis of said bolt, a series of variously sized circumferentially spaced orifices extending axially through said plate in a circle of rotation in alignment with said openings in said radially disposed surfaces, said bolt being adapted to be tightened to clamp said metering plate between said upper and lower body portions when an orifice therein is rotated in aligned position with said openings in said radially disposed surfaces to provide the sole means for securing said upper and lower body portions and metering plate in sealed fluid tight relationship during the operation of said device.

References Cited in the file of this patent

UNITED STATES PATENTS

| | | |
|---|---|---|
| 917,970 | Smith et al. | Apr. 13, 1909 |
| 1,989,468 | Spencer | Jan. 29, 1935 |
| 2,150,077 | Oehler | Mar. 7, 1939 |
| 2,219,504 | Willis | Oct. 29, 1940 |
| 2,346,501 | Nagle et al. | Apr. 11, 1944 |
| 2,656,853 | Scheele | Oct. 27, 1953 |
| 2,780,232 | Ney | Feb. 5, 1957 |
| 2,780,833 | Braunlich | Feb. 12, 1957 |
| 2,791,245 | Alcott | May 7, 1957 |
| 2,821,210 | Liley | Jan. 28, 1958 |